May 31, 1955  D. H. GREENWOOD  2,709,455
LINE BLIND VALVE
Filed Feb. 21, 1952  2 Sheets-Sheet 1

INVENTOR:
DOLPHICE H. GREENWOOD
BY
Walter J. Stevenson
AGENT

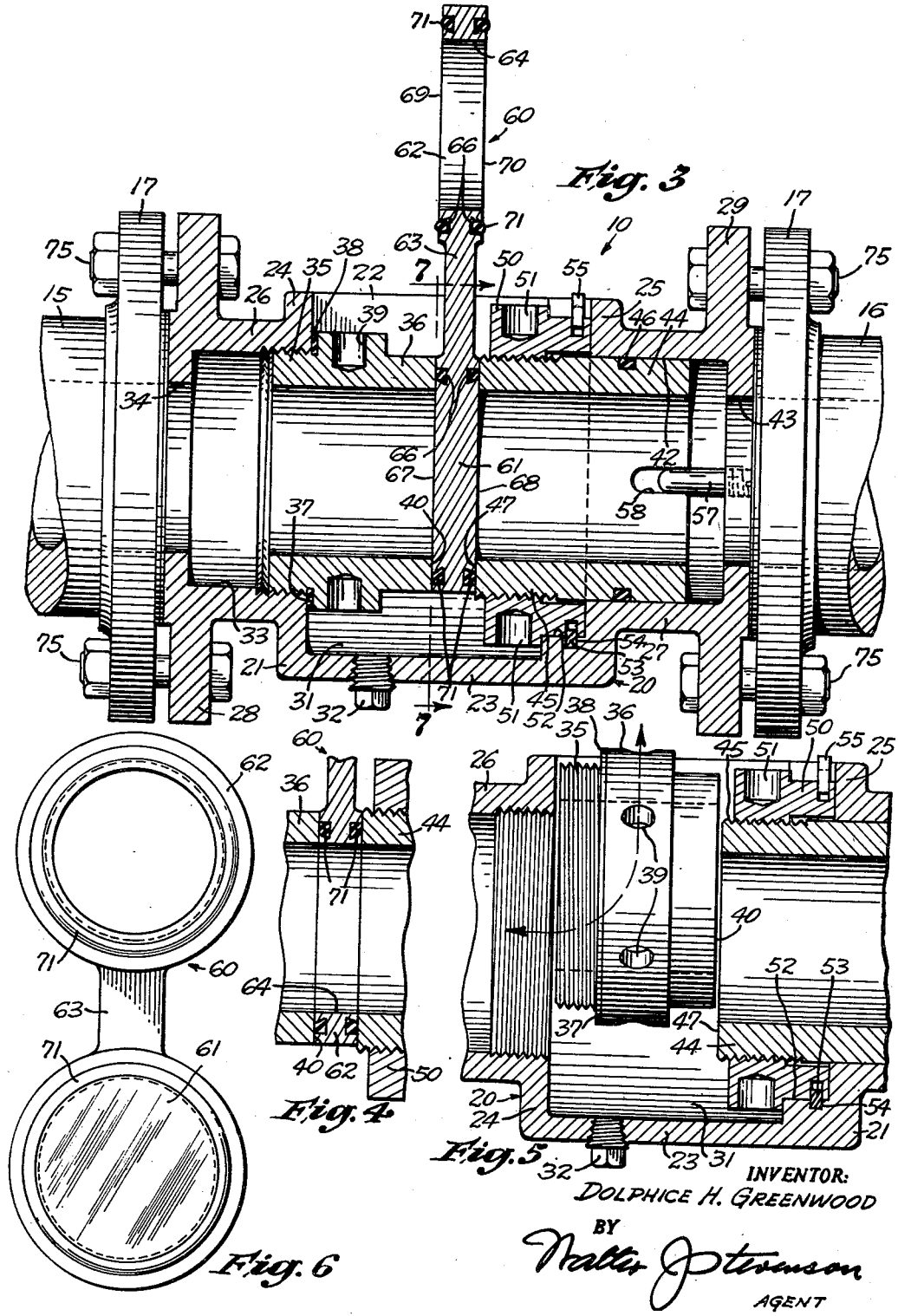

United States Patent Office 2,709,455
Patented May 31, 1955

2,709,455

LINE BLIND VALVE

Dolphice H. Greenwood, Pasadena, Calif.

Application February 21, 1952, Serial No. 272,805

17 Claims. (Cl. 138—94.3)

This invention relates generally to valves and more particularly to a valve commonly referred to as a line blind, such a valve being employed in a fluid line and operative to completely shut off the flow of fluid through the line.

Valves of the line blind type are used extensively in pipe lines, pumping systems, etc., where it becomes necessary to cut off the flow of fluid to allow replacement or repair of parts of valves and other equipment. Conventional line blinds now in use include a pair of flanged fittings, each screwed onto a threaded end of the line in which the valve is installed, and a "blind plate" adapted to be inserted between the flange fittings to close off the line, sealing means usually being provided between the plate and the flanged fittings. Various expedients have been employed for drawing the flanged fittings toward each other so as to firmly grip the blind plate therebetween to shut off the flow of fluid through the line. It is thus apparent that in order to effect a positive seal, by means of such conventional line blinds, it is necessary to draw the adjacent ends of the line toward each other and this results in springing or distorting of the line.

The line blind is usually installed in a manifold having vertical branches connected at their upper ends by aligned horizontal sections between which the line blind is connected. It has been determined in practice that alternate spreading and drawing together of the sections of the manifold results in springing of the same so that eventually it is extremely difficult, and frequently impossible, to maintain the interengaging faces of the flanged fittings and those of the blind plate in parallelism. When this condition exists, it is well nigh impossible to prevent leakage of the fluid past the sealing means between the blind plate and the fittings. Consequently, it frequently becomes necessary to install new pipe sections in the manifold and this, of course, entails considerable time and expense, besides resulting in shutting down of the fluid pumping or other system in which the line blind valve is installed. Moreover, when the leaking valve is incorporated in, for example, an oil refinery line for conveying inflammable fluids, a very serious fire hazard is created.

It is therefore an important object of this invention to provide a line blind valve which is leak-proof by reason of the fact that it is operative to provide clearance within the valve body to allow for insertion and removal of the blind plate without affecting in any way the position or condition of the ends of the line in which the valve is installed, the clamping and releasing of the plate being effected by elements of the valve itself without straining the line in any way. This object is best achieved by providing a valve body having a flow passage therethrough, the ends of the body being fixedly connected to the adjacent ends of the line or manifold, the valve further having a relatively fixed annular element and an axially slidable annular element movable toward and away from the fixed element, the annular elements together forming part of the flow passage. The inner, adjacent ends of the annular elements provide valving faces which cooperate with the opposite faces of the line blind plate which is insertable between said ends and adapted to be clamped therebetween to shut off the flow of fluid through the passage.

Another object of the invention is to provide a line blind valve, of the character referred to, having means embodied therein for sliding the movable element away from and toward the fixed element so as to provide a space between the adjacent ends of these elements for receiving the line blind plate, and to decrease the width of this space to clamp the plate firmly between the valving faces of the elements to shut off flow of fluid through the valve body, the blind plate having at one of its ends an orifice adapted to align axially with the flow passage when this end of the plate is inserted into the space between said elements.

Another object is to provide a line blind valve in which the means for shifting the movable element consists of a nut member rotatable within the valve body and retained against axial movement therein, the nut member having internal screw threads engaging external screw threads on the movable element, rotation of the nut effecting axial sliding movement of the movable element toward and away from the fixed element, depending upon the direction of rotation of the nut member.

Another object is to provide in a valve of the type indicated means for retaining the nut member in place in the body while permitting rotation thereof, this means consisting of a split ring disposed within an annular groove in the body and engaging a peripheral groove in the nut member.

A further object is to provide means for sealing the interengaging faces of the blind plate and the annular elements and the annular face between the periphery of the movable element and the bore of the valve body in which this element slides. In the first case, the sealing means includes annular resilient sealing elements commonly referred to as O-rings, seated in annular grooves in the opposite faces of the blind plate and compressible between the plate and the inner end faces of the annular elements, the grooves of the blind plate being of a novel shape capable of retaining the O-rings in place during insertion and removal of the plate, so as to prevent displacement of the rings, due to friction between the parts as the plate is slid into and removed from the body. In the second case, the sealing means consists of an O-ring held in a peripheral groove in the movable element and engaging the bore of the valve body.

Another important object is to provide a line blind valve in which the ends of the body have flanges adapted to be bolted to similar flanges on the ends of the fluid line, said ends of the body being connected by an integral, channel-shaped intermediate portion which defines with said ends of the body a receptacle or well for receiving fluid which may flow from the valve and the adjacent portions of the line when the blind plate is removed. The well thus prevents leaking or draining of the fluid onto areas adjacent the line blind and this is an important consideration when the fluid is of an inflammable nature. In accordance with my invention, a plug in the bottom wall of the well may be removed to allow draining of the fluid from the well into a suitable receptacle placed therebeneath.

A still further important object of the invention is to provide a line blind valve, of the character referred to, the parts of which may be disassembled from the body without removing the body from the pipe line in which the valve is connected. This object is best attained by moving the internal components of the valve, i. e., the stationary and slidable annular elements, the operating nut member and its split retaining ring, longitudinally from the end portions of the body into the central well portion of the body and then removing these components through the open upper side of the well portion. Such removal of the components is made possible by so proportioning their lengths and screw-threaded portions that removal of the blind plate provides the clearance necessary to allow inward axial movement of the stationary annular element to a position where it can be removed in a radial direction from the well portion of the body, such removal of this element then permitting similar removal of the other components of the valve through the open upper side of the well portion. Thus, by this provision, the operating parts of the valve may be readily disassembled for repair or replacement without detaching the valve body from the pipe line or manifold and the alignment of the adjoining ends of the pipe is not disturbed in any way.

A still further object of the invention is to provide a practical line blind valve which is relatively small and compact, one which is conveniently installed in a pipe line or the like, one which is simple in construction and inexpensive to produce and install, and one which is leak-proof and highly efficient in performing its intended function.

Further objects will appear from the following description, and from the drawings, which are intended for the purpose of illustration only, and in which:

Fig. 3 is a longitudinal sectional view, taken on line 3—3 of Fig. 2;

Fig. 4 is a fragmentary sectional view of the central portion of the valve, showing the blind plate reversed to allow fluid flow through the valve;

Fig. 5 is a fragmentary view similar to Fig. 4, illustrating the method of assembling and disassembling the parts of the valve while the valve body remains connected in the pipe line;

Fig. 6 is a side view of the line blind element; and

Figure 1:
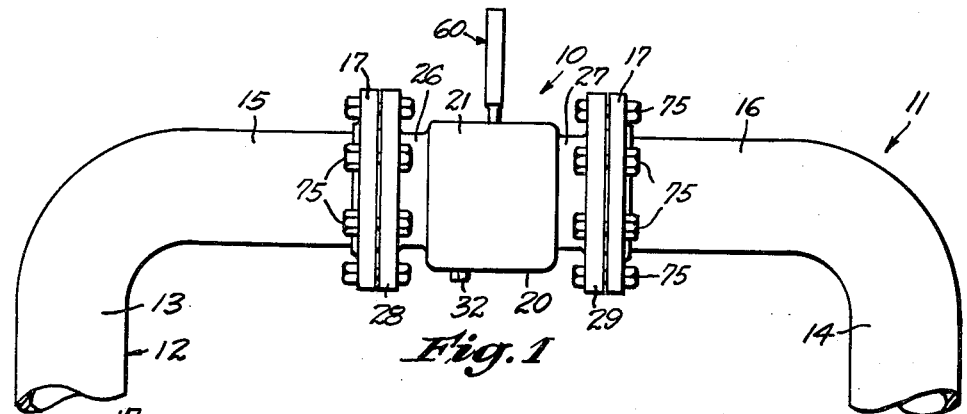
Fig. 1 is a side elevational view of a pipe manifold, showing the present improved line blind valve installed in the horizontal section thereof.

Referring to the drawings in detail, my improved line blind valve 10 is shown as installed in a typical manifold 11 incorporated in a pipe line 12 which may convey various fluids in various chemical and process plants, producing oil fields, oil refineries and other establishments. The manifold 11 may include vertical pipe sections or risers 13 and 14 having respective horizontal axially aligned, pipe sections 15 and 16 having pipe flanges 17 at their free ends which are spaced apart.

The line blind valve 10 has a valve body 20 which is adapted to be installed in the manifold 11 between the flanges 17 of the pipe sections 15 and 16. The body 20 has a central portion 21 provided with vertical walls 22 connected at their lower ends by a curved bottom wall 23, see Fig. 7. The central portion 21 of the body 20 has end walls 24 and 25 from which project tubular end portions 26 and 27 terminating in circular flanges 28 and 29 having bolt holes 30. The end portion 26 has a bore 33 and a smaller bore 34 at its flanged end 28. The walls 22, 23, 24 and 25 define between them a receptacle or well 31. The bottom wall 23 has a threaded hole in which is screwed a drain plug 32.

The inner end of the bore 33 is screw-threaded to adapt it to receive the reduced screw-threaded end 35 of a stationary annular element or sub nut 36, this element having a shoulder 37 adapted to abut the inner face of the end wall 24. A compressible sealing ring 38 is interposed between the end wall 24 and the shoulder 37 to prevent leakage of fluid between these parts. The sub-nut 36 has a plurality of sockets 39 in its periphery by which the sub nut may be tightened and loosened through the medium of a spanner wrench. The inner machined end of the tubular sub nut 36 constitutes a valving face 40.

The tubular end portion 27 of the valve body 20 has a bore 42 and a smaller bore 43 at its outer flanged end 29. Slidable axially in the bore 42 is a slidable element or sleeve 44 which has an inner screw-threaded end 45 projecting into the central well portion 31. Intermediate its ends, the sleeve 44 has a peripheral groove in which is disposed a resilient sealing element 46 of the type commonly referred to as an O-ring capable of sealing against considerable pressure, the O-ring 46 engaging the bore 42 as shown in Fig. 3. The machined inner end of the sleeve 44 provides a valving face 47.

Screwed onto the threaded end 45 of the sleeve 44 is an operating nut 50 which has sockets 51 in its periphery by which it can be turned by means of a spanner wrench. An end of the nut 50 is positioned within a counterbore 52 formed in the inner surface of the end wall 25. A split, expansible retainer ring 53 fits within a peripheral groove in the nut 50 and normally is expanded into a circular recess 54 formed in the circular surface of the counterbore 52 to retain the nut in place so as to prevent axial movement of the nut. As shown best in Figs. 2 and 8, the retainer ring 53 has outwardly projecting ears 55 which normally are positioned within a slot 56 formed in the inner face of the end wall 25. A screw 57 is threaded inwardly through a hole in the flanged end 29 of the body 20, laterally of the bore 43, and its inner end engages in a slot 58 in the sleeve 44 to key the latter against rotation.

The inner ends of the sub nut 36 and the sleeve 44 are spaced apart to allow insertion of a line blind element 60 therebetween. The line blind element 60 is of the type commonly referred to as a spectacle plate, due to its peculiar outline, the blind 60 having a pair of circular plates 61 and 62 which are joined by a web 63. The plate 61 constitutes a block or blind for shutting off flow of fluid through the valve when it is arranged as shown in Fig. 3. The other plate 62 has an orifice 64 therein through which the fluid may flow through the valve when the element 60 is reversed to dispose this plate between the sub nut and the sleeve. The plates 61 and 62 have circular grooves 66 in their opposite valving faces 67, 68 and 69, 70 in which are placed resilient sealing elements 71 of the O-ring type. As shown best in Fig. 3, the grooves 66 are rectangular in cross section except that their circular surfaces of smaller diameter are tapered inwardly. By this provision, the sealing rings 71 are more effectively retained in place and resist frictional force encountered as the line blind element 60 is slid into and removed from the valve body 20 in the manner and for the purpose to be more fully explained hereinafter.

Figure 2:
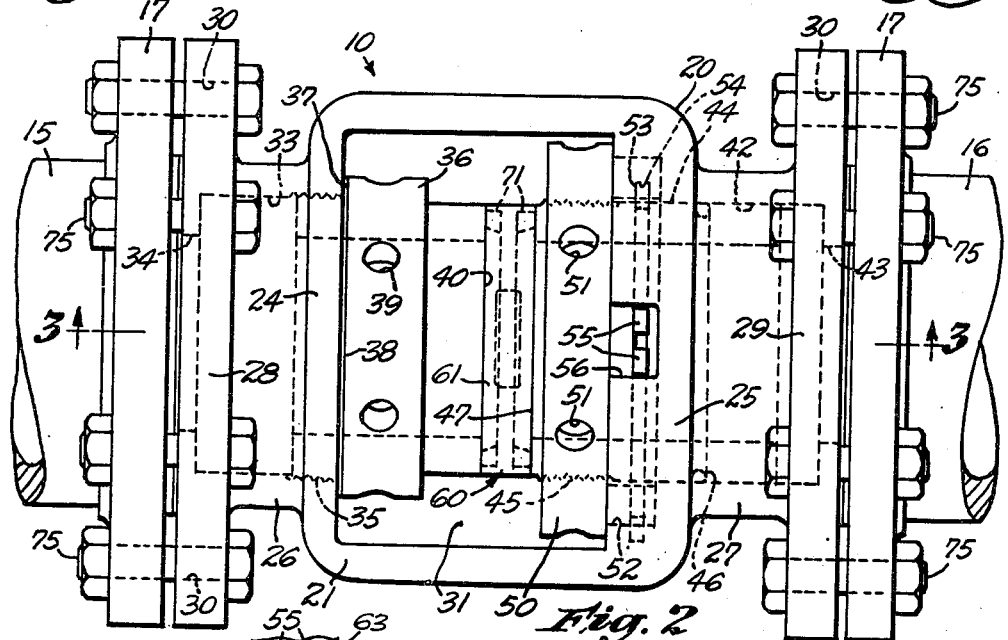
Fig. 2 is an enlarged plan view of my improved line blind valve.

To assemble the parts of the line blind valve 10, the sealing ring 46 is applied to the sleeve 44 and the operating nut 50 is then screwed onto the threaded end of this nut. The split ring 53 is then placed in the peripheral groove of the nut 45 and the assembly 44, 46, 50, 53 is lowered through the open top of the central portion 21 of the body 20 into axial alignment with the bore 42, after which the assembly is slid into this bore and counterbore 52. During such positioning of the assembly, the split ring 53 is contracted to adapt it to enter the groove 54, this being accomplished by drawing the ears 55 at the ends of the ring together. As the assembly is slid into place, the ears 55 are guided into the slot 56 of the body 20, as shown in Fig. 2, after which they are released to allow expansion of the retainer ring 53 into the groove 54 so as to retain the assembly in place. Also, during sliding of the assembly 44, 46, 50, 53 into place it is turned to cause the screw 57 to enter the slot 58 of the sleeve 44 so as to key the latter against rotation in the body. The sub nut 36 is next lowered through the open top of the body 20 into axial alignment with the bore 33, after which the nut is screwed into the inner threaded end of the bore to compress the sealing ring 38 between its shoulder 37 and the inner face of the wall 24.

The line blind valve, assembled as explained above, may now be connected in a pipe line or in the manifold 11 as shown in Figs. 1 to 3 by simply placing the valve between the ends of the pipe sections 15 and 16 and connecting its flanges 28 and 29 to the flanges 17 of the pipe sections, by means of the usual bolts 75.

To condition the line blind valve 10 for use in the manifold 11, it is necessary to insert the line blind element 60 into the body 20 between the adjoining ends of the sub nut 36 and the sleeve 44. To accomplish this, the operating nut 50 is first rotated in a direction (counterclockwise as viewed in Fig. 7) to shift the sleeve 44 toward the right-hand end of the valve, so as to provide a space between the valving faces 40 and 47 of sufficient width to allow insertion of one of the plates or heads 61 or 62 thereinto. Assuming that it is desired to adjust the valve to allow flow of fluid therethrough, the blind element 60 is arranged with its head 62 between the sub nut 36 and the sleeve 44. With the blind element thus positioned, the operating nut 50 is rotated in clockwise direction, as viewed in Fig. 7, so as to shift the sleeve 44 toward the sub nut 36. As the sleeve 44 is thus shifted, the head 62 becomes clamped firmly between the valving faces 40 and 47 and the sealing rings 71, which surround the orifice 64, are compressed in their grooves 66 to effect a positive fluid-tight seal and thus prevent leakage of the fluid between the co-operating faces 40, 63 and 47, 67. It is to be particularly noted at this point that since the sleeve 44 moves axially within and independently of the body 20, the flanged ends 28 and 29 of the body and the pipe sections 13 and 14 are not disturbed in any way. Consequently, clamping of the line blind element 60 in place is effected without drawing the pipe sections toward each other, and springing, bending or otherwise distorting these sections is wholly avoided. This is an important improvement over conventional line blind valves wherein the valve body is composed of two separate members, each connected to one of the pipe sections, the members being movable axially relative to each other to clamp and release the line blind, such relative movement being transmitted to the sides of the manifold to cause springing of the same. As will be apparent, such distortion of the pipe sections leads to mal-alignment of the valve components with the result that leakage occurs between the interengaging faces of the blind and the valve body members.

Figure 7:
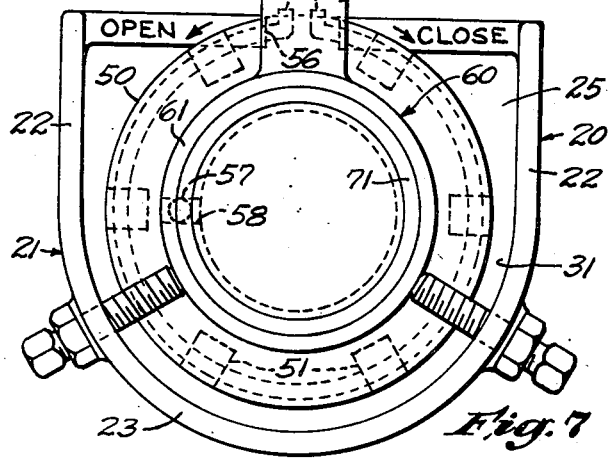
Fig. 7 is a cross-sectional view, taken on line 7—7 of Fig. 3.

When it is desired to shut off the flow of fluid through the line, the sleeve 44 is slid axially away from the sub nut 36 so as to increase the distance between the valving faces 40 and 47 and thus release the head 62 of the line blind element 60, such shifting of the sleeve being effected by simply rotating the operating nut 50 in counterclockwise directions, as viewed in Fig. 7. The element 60 then may be withdrawn from the valve body 20 and reversed, end for end, after which it is reinserted into the body with its circular head or line blind 61 positioned between the valving faces 40 and 47. The nut 50 is then rotated to feed the sleeve 44 toward the sub nut 36 and grip the blind tightly therebetween and to compress the sealing rings 71, as shown in Fig. 3, this condition being brought about without disturbing the ends of the pipe line between which the body is connected. Thus, my line blind valve functions to establish fluid flow and to shut off such flow through the line and, since it is unnecessary to draw the ends of the line toward each other or to spread them apart in adjusting the line blind, the possibility of misaligning the various parts to cause leakage, is avoided.

During the reversing of the line blind element 60 in the valve body, fluid which remains in the short length of the line and within the valve drains into the receptacle or well 31. Thus, the fluid is trapped and prevented from flowing from the valve onto the ground, floor or other adjacent areas to create a fire hazard when the fluid is of an inflammable nature. The fluid collected within the well 31 may be drained into a suitable container by simply removing the drain plug 32.

As previously stated, it is an important object of this invention to provide a line blind valve in which the elements for clamping the removable line blind element in place are assembled within a one-piece valve body and removable therefrom without disconnecting the body from the pipe line. Referring to Fig. 3, when it is desired to remove the internal elements of the valve for resurfacing or replacing of the sealing rings, the operating nut 50 is first rotated in a direction to shift the sleeve 44 away from the sub nut 36 so as to free the line blind element 60 which is then withdrawn from the valve body 20, as already explained. The sub nut 36 is then unscrewed from within the wall 24 toward the center of the valve body. Since the length of the screw-threaded end 35 of the sub nut is less than the thickness of the line blind element 60, when the sub nut is unscrewed completely it can be removed from the valve body by simply lifting it therefrom through the open upper end of the central portion 21.

The sleeve 44 and nut 50 then may be removed from the valve body 20 by first contracting the retainer ring 53 to free it from the groove 54 in the body and then sliding the operating nut and sleeve toward the center of the body and lifting these parts as a unit from the body through its open upper side. To contract the retainer ring 53, its ears 55 are simply drawn together or one ear forced toward the other ear.

With the several components thus removed from the valve body, they may be cleaned, re-surfaced or otherwise reconditioned and provided with new sealing rings 38, 46 and 71. The parts then may be re-assembled within the valve body 20 by reversing the procedure outlined above. It is seen, therefore, that by the present valve structure the internal parts may be conveniently and quickly assembled and disassembled from the one-piece valve body without straining or otherwise affecting the pipe line in which the line blind is installed.

It is within the concept of this invention to employ worm-and-wheel means for rotating the nut member in lieu of the spanner wrench sockets, such means being commonly used in conventional line blind valves.

I claim as my invention:

1. A line blind valve for use in a pipe line or the like, comprising: a one-piece valve body having opposite tubular ends securable to spaced ends of a pipe line, said ends joined by a central portion having an opening in a side thereof, one of said ends having an internal screw-threaded inner portion; a first stationary tubular element having a length less than the length of said opening and disposed within said body and having an externally threaded end screwed into said screw-threaded inner portion; a second tubular element having a length less than the length of said opening and slidable axially within the other end of said body, said first and second elements having adjacent inner ends disposed in said central portion, said elements and said tubular ends defining a flow passage through the valve; a line blind element insertable into said body through said opening into position between said adjacent inner ends; and rotary operating means on said body engaging said second element and operative to shift the same axially toward and away from said first element to clamp said line blind element between said adjacent ends so as to shut said flow passage, or to release said blind element to allow withdrawal of the same from said body through said opening.

2. A line blind valve as defined in claim 1 in which said central portion of said valve body has vertical walls joined by a bottom wall, said walls defining between them a well into which fluid in the pipe line can drain when said line blind element is removed, said bottom wall having a drain opening therein, and a drain plug removably disposed in said opening.

3. A line blind valve as defined in claim 1 in which said second tubular element has an externally screw-threaded inner end, and in which said operating means consists of a nut member screwed onto said screw-threaded end of said second tubular element and rotatable in said body, said valve including retaining means on said body engaging said nut member for retaining the same against axial movement.

4. A line blind valve as defined in claim 3 in which said retaining means consists of a split ring disposed in a peripheral recess in said second tubular element and expansible into a circular groove in said body.

5. A line blind valve as defined in claim 4 in which said expansible split ring has ears at its free ends projecting radially outwardly into a slot in said body to be readily accessible for contracting said ring to remove said nut member from said body.

6. A line blind valve for use in a pipe line or the like, comprising: a one-piece valve body having a hollow central portion provided with an opening in its top and opposite end portions detachably securable to spaced ends of a pipe line, said end portions having aligned bores, the bore in one of said end portions having a screw-threaded inner end; a sub nut having a length less than the length of said opening, said sub nut being disposed within said body and having a threaded end screwed into said threaded end of said bore; a sleeve having a length less than the length of said opening and slidable axially in the bore of the other end portion toward and away from said sub nut; a line blind element having an end insertable through the opening and into position between the adjacent ends of said sub nut and said sleeve; an operating member rotatable on said body; and inter-engaging screw threads on said sleeve and said operating member by which rotation of the operating member effects axial sliding movement of the sleeve toward and away from said sub nut so as to clamp said line blind therebetween or to release the same.

7. A line blind valve for use in a pipe line or the like, comprising: a one-piece valve body having a hollow central portion provided with an opening in its top and opposite end portions securable to spaced ends of a pipe line, said end portions having aligned bores, the bore in one of said end portions having a screw-threaded inner end; a sub nut having a length less than the length of said opening, said sub nut being disposed within said body and having a threaded end screwed into said threaded end of said bore, said sub nut having an annular shoulder, a sealing ring surrounding said sub nut and compressed between said shoulder and said body; a sleeve having a length less than the length of said opening and slidable axially in the bore of the other end portion toward and away from said sub nut; a line blind element having an end insertable into said body through the open top thereof and into position between the adjacent ends of said sub nut and said sleeve; an operating member rotatable on said body; and inter-engaging screw threads on said sleeve and said operating member by which rotation of the operating member effects axial sliding movement of the sleeve toward and away from said sub nut so as to clamp said line blind element therebetween or to release the same.

8. A line blind valve for use in a pipe line or the like, comprising: a one-piece valve body having a hollow central portion provided with an opening in its top and opposite end portions securable to spaced ends of a pipe line, said end portions having aligned bores, the bore in one of said end portions having a screw-threaded inner end; a sub nut disposed in said body and having a threaded end screwed into said threaded end of said bore, said sub nut being of a length less than the length of said opening and having an annular shoulder; a sealing ring surrounding said sub nut and compressed between said shoulder and said body; a sleeve disposed within said body and slidable axially in the bore of the other end portion toward and away from said sub nut, said sleeve being of a length less than the length of said opening and having a peripheral groove; a sealing ring disposed in said groove and engaging said bore in which said sleeve is slidable; a line blind element having an end insertable into said body through the open top thereof and into position between the adjacent ends of said sub nut and said sleeve disposed in said central portion; an operating member rotatable on said body; and inter-engaging screw threads on said sleeve and said operating member by which rotation of the operating member effects axial sliding movement of the sleeve toward and away from said sub nut so as to clamp said line blind element therebetween or to release the same.

9. A line blind valve for use in a pipe line or the like, comprising: a one-piece valve body having a hollow central portion provided with an opening in its top and opposite end portions securable to spaced ends of a pipe line, said end portions having aligned bores, the bore in one of said end portions having a screw-threaded inner end; a sub nut disposed in said body and having a threaded end screwed into said threaded end of said bore, said sub nut being of a length less than the length of said opening and having an annular shoulder; a sealing ring surrounding said sub nut and compressed between said shoulder and said body; a sleeve disposed within said body and slidable axially in the bore of the other end portion toward and away from said sub nut, said sleeve being of a length less than the length of said opening and having an inner externally-threaded end disposed within said opening, said sleeve having a peripheral groove; a sealing ring disposed in said groove and engaging said bore in which said sleeve is slidable; a line blind element having an end insertable into said body through said open top thereof and into position between the adjacent ends of said sub nut and said sleeve disposed in said central portion; a nut member rotatable on said body and engaging the threads of said sleeve; retaining means on said body engaging said nut member for preventing axial movement thereof; and inter-engaging key means on said body and said sleeve for preventing rotation of the sleeve while allowing axial sliding movement thereof, rotation of said nut member in one direction effecting axial sliding movement of said sleeve toward said sub nut so as to grip said line blind element between their adjacent inner ends, and rotation of the nut member in the opposite direction shifting the sleeve axially away from said sub nut so as to release said line blind element.

10. A line blind valve as defined in claim 9 including sealing rings of circular cross section compressed between said blind element and the inner ends of said sub nut and said sleeve.

11. A line blind valve as defined in claim 9 in which each of the side surfaces of said blind element has a groove arranged concentrically with the common axis of said sub nut and said sleeve, and a compressible sealing ring of circular cross section in each of said grooves.

12. A line blind valve as defined in claim 11 in which said grooves in said blind element are circular in outline and generally quadrilateral in cross section, having outer and inner annular walls, said inner wall being tapered, the cross sectional width of said grooves being greater than the cross sectional diameter of said rings, the depth of said grooves being less than the cross sectional diameter of said rings.

13. A line blind valve for use in a pipe line or the like, comprising: a one-piece valve body having a hollow central portion provided with an opening in its top and opposite end portions securable to spaced ends of a pipe line, said end portions having aligned bores, the bore in one of said end portions having a screw-threaded inner end; a sub nut having a threaded end screwed into said threaded end of said bore; a sleeve slidable axially in the bore of the other end portion toward and away from said sub nut; a line blind element having an end insertable into said body through the open top thereof and into position between the adjacent ends of said sub nut and said sleeve within said central portion; an operating member rotatable on said body; and inter-engaging screw threads on said sleeve and said operating member by which rotation of the operating member effects axial movement of the sleeve toward and away from said sub nut so as to clamp said line blind element therebetween or to release the same, the length of said threaded end of said sub nut being less than the thickness of said blind element and the length of said sleeve being less than the length of said opening in said central portion allowing insertion into and removal of said sub nut and said sleeve from said central portion of said body.

14. A valve installable in a pipe line or the like, including: a valve body having a flow passage therein; stationary means in said body providing a first valving face surrounding the passage; a member movable in said body toward and away from said valving face and having a flat face associated with said first valving face, one of said faces having an annular groove therein; and a resilient O-ring disposed in said groove and of a cross sectional area less than the cross sectional area of said groove, said ring being compressed therein upon direct engagement between said faces when said valve member is moved toward said stationary means, said ring having a cross sectional diameter greater than the depth of said groove, said annular groove having an outer wall substantially normal to said faces and to the bottom of the groove, the inner wall of said annular groove being angularly related to said faces, said groove being of greater width at its bottom than at its open side.

15. A valve installable in a pipe line or the like, including: a valve body having a flow passage therein; stationary means in said body providing a first valving face surrounding the passage; a member movable in said body toward and away from said valving face and having a second valving face associated with said first valving face, said member having an annular groove in its said second valving face; and a resilient O-ring having a cross sectional diameter less than the cross sectional width of said groove but greater than the depth of said groove, said ring being disposed in said groove and capable of being compressed therein in response to direct engagement of said member against said stationary means, said annular groove having an outer wall substantially normal to said faces and to the bottom of the groove, the inner wall of said annular groove being angularly related to said faces, said groove being of greater width at its bottom than at its open side.

16. A valve installable in a pipe line or the like, including: a valve body having a flow passage therein; a stationary valving element in said body providing a first valving face surrounding the passage; a member movable in said body toward and away from said valving face and having a second valving face associated with said first valving face, one of said faces having an annular groove in its said second valving face; and a resilient O-ring having a cross sectional diameter less than the cross sectional width of said groove but greater than the depth of said groove, said ring being disposed in said groove and capable of being compressed therein in response to direct engagement of said member against said stationary valving element, said annular groove having an outer wall substantially normal to said faces and to the bottom of the groove, the inner wall of said annular groove being angularly related to said faces, said groove being of greater width at its bottom than at its open side.

17. A valve installable in a pipe line or the like, including: a valve body having a flow passage therein; stationary means in said body providing a first valving face surrounding the passage; a member movable in said body toward and away from said valving face and having a second valving face associated with said first valving face, one of said faces having a groove therein, said groove being circular in outline and having outer and inner annular, concentric walls, said inner wall being tapered and diverging from said outer wall in a direction toward the bottom of the groove so as to provide a frusto-conical shoulder; and a resilient O-ring disposed in said groove and lightly stretched around said shoulder, said ring having a cross sectional diameter less than the cross sectional over-all width of said groove but greater than the depth of said groove, said ring being capable of being compressed therein in response to direct engagement of said member against said stationary means, the portion of said shoulder at said second valving face overlying a portion of said O-ring.

References Cited in the file of this patent

UNITED STATES PATENTS

| | | |
|---|---|---|
| 467,955 | Richards | Feb. 2, 1892 |
| 1,599,168 | Duncan | Sept. 7, 1926 |
| 1,938,460 | Muff | Dec. 5, 1933 |
| 2,214,959 | Hamer | Sept. 17, 1940 |
| 2,340,499 | Zachow | Feb. 1, 1944 |
| 2,360,734 | Smith | Oct. 17, 1944 |
| 2,433,973 | Anderson | Jan. 6, 1948 |
| 2,558,247 | Hamer | June 26, 1951 |
| 2,566,343 | Livesay | Sept. 4, 1951 |

FOREIGN PATENTS

| | | |
|---|---|---|
| 324,654 | Germany | Nov. 20, 1918 |